(12) United States Patent
Stevenson et al.

(10) Patent No.: US 12,160,661 B2
(45) Date of Patent: Dec. 3, 2024

(54) SYSTEMS AND METHODS FOR OPERATING ILLUMINATION ASSEMBLIES IN A MULTI-IMAGER ENVIRONMENT

(71) Applicant: ZEBRA TECHNOLOGIES CORPORATION, Lincolnshire, IL (US)

(72) Inventors: Thomas J. Stevenson, Wixom, MI (US); Diana Askhatova, Toronto (CA); Matthew Lawrence Horner, Sound Beach, NY (US)

(73) Assignee: Zebra Technologies Corporation, Lincolnshire, IL (US)

( * ) Notice: Subject to any disclaimer, the term of this patent is extended or adjusted under 35 U.S.C. 154(b) by 146 days.

(21) Appl. No.: 17/957,533

(22) Filed: Sep. 30, 2022

(65) Prior Publication Data

US 2024/0114238 A1    Apr. 4, 2024

(51) Int. Cl.
*G03B 15/00* (2021.01)
*G03B 15/02* (2021.01)
*H04N 23/56* (2023.01)
*H04N 23/661* (2023.01)

(52) U.S. Cl.
CPC .......... *H04N 23/661* (2023.01); *G03B 15/02* (2013.01); *H04N 23/56* (2023.01)

(58) Field of Classification Search
CPC ....... H04N 23/661; H04N 23/56; G03B 15/02
See application file for complete search history.

(56) References Cited

U.S. PATENT DOCUMENTS

| | | | | |
|---|---|---|---|---|
| 7,733,464 | B2 * | 6/2010 | David | G01S 17/18 356/5.03 |
| 7,881,496 | B2 * | 2/2011 | Camilleri | G08G 1/16 348/148 |
| 9,367,746 | B2 * | 6/2016 | Ishihara | G06V 40/23 |
| 2002/0041089 | A1 * | 4/2002 | Yasui | B60R 21/01534 280/728.2 |
| 2002/0117547 | A1 | 8/2002 | Krichever | |
| 2004/0146203 | A1 * | 7/2004 | Yoshimura | G06T 7/254 382/218 |
| 2004/0165091 | A1 * | 8/2004 | Takemura | H04N 23/70 348/E5.034 |

(Continued)

OTHER PUBLICATIONS

International Search Report and Written Opinion for International Application No. PCT/US2023/33138 mailed on Dec. 18, 2023.

*Primary Examiner* — Frank F Huang
(74) *Attorney, Agent, or Firm* — Yuri Astvatsaturov

(57) ABSTRACT

At least some embodiment of the present invention are directed to mean for operating an illumination assembly associated with a group of imaging devices. An example method includes causing each of a plurality of imaging devices to capture image data during a group acquisition operation, each of the plurality of imaging devices has (i) a respective delay until a start of an exposure duration, (ii) the respective exposure duration, and (iii) a total operation duration. The method also includes causing an illumination assembly to transition from a first state to a second state based on a shortest delay of the imaging devices and further causing the illumination assembly to transition from the second state to a third state based on a longest total operation duration of the imaging devices.

21 Claims, 2 Drawing Sheets

(56) References Cited

U.S. PATENT DOCUMENTS

| | | | |
|---|---|---|---|
| 2006/0114333 A1 | 6/2006 | Gokturk et al. | |
| 2006/0180670 A1* | 8/2006 | Acosta | G06K 7/10732 |
| | | | 235/462.31 |
| 2007/0211157 A1* | 9/2007 | Humpoletz | G01J 5/22 |
| | | | 348/333.01 |
| 2007/0296849 A1* | 12/2007 | Sano | H04N 23/70 |
| | | | 348/E5.034 |
| 2009/0021612 A1* | 1/2009 | Hamilton, Jr. | H04N 25/534 |
| | | | 348/E9.037 |
| 2009/0153699 A1* | 6/2009 | Satoh | H04N 25/715 |
| | | | 348/229.1 |
| 2009/0244288 A1* | 10/2009 | Fujimoto | H04N 23/56 |
| | | | 250/206 |
| 2010/0149393 A1* | 6/2010 | Zarnowski | H04N 25/534 |
| | | | 348/E5.091 |
| 2010/0265316 A1* | 10/2010 | Sali | H04N 13/254 |
| | | | 348/46 |
| 2011/0268194 A1* | 11/2011 | Nagano | H04N 21/23614 |
| | | | 375/E7.076 |
| 2013/0329006 A1* | 12/2013 | Boles | H04N 9/73 |
| | | | 348/42 |
| 2021/0021780 A1 | 1/2021 | Kim et al. | |

* cited by examiner

SYSTEMS AND METHODS FOR OPERATING ILLUMINATION ASSEMBLIES IN A MULTI-IMAGER ENVIRONMENT

BACKGROUND

In applications such as fixed industrial scanning multiple cameras may be configured in a way where they share a single illumination assembly that is controlled by, for example, a single communication/signal bus. When visual inspection needs to occur simultaneously, such a configuration may not be an issue as the illumination can be controlled to activate in concert with the simultaneous activation of the imaging devices. However, in cases where cameras are programmed to activate at different times (due to, e.g., a product moving from location A on a conveyor belt at time t to location B at time t+n), where they are activated with different exposure durations, where there is a non-uniform delay in activation due to infrastructure, or other instances of non-synchronous operation, problems may arise in terms of proper timing for activating the illumination assembly to provide sufficient illumination during the operation of all cameras.

Although a work-around for this problem involves operating the illumination assembly in "torch" mode where it remains turned on indefinitely, such approach results in wasted energy.

Thus, there is a need for systems and methods for coordinating activation of an illumination assembly that is associated with multiple, non-synchronously activated imaging assemblies.

SUMMARY

In an embodiment, the present invention is an imaging system comprising: a host device having a processor; a plurality of imaging devices, each of the plurality of imaging devices being communicatively coupled with the host device; and an illumination assembly for illuminating at least one target being imaged by each of the plurality of imaging devices, the illumination assembly being communicatively coupled with the host device, wherein each of the plurality of imaging devices is caused, by the host, to capture image data during a group acquisition operation, each of the plurality of imaging devices having associated therewith (i) a respective delay until a respective start of an exposure duration, (ii) the respective exposure duration over which image data is captured, and (iii) a respective total operation duration which include the respective delay and the respective exposure duration, wherein, during the group acquisition operation, the illumination assembly is caused, by the host device, to transition from a first state of operation to a second state of operation based on a shortest delay selected from each of the respective delay of the each of the plurality of imaging devices, and wherein, during the group acquisition operation, the illumination assembly is caused to transition from the second state of operation to a third state of operation based on a longest total operation duration selected from each of the respective total operation duration of the each of the plurality of imaging devices.

In another embodiment, the present invention is a method of operating a vision system, comprising: (a) causing, by a host device having a processor, each of a plurality of imaging devices to capture image data during a group acquisition operation, each of the plurality of imaging devices having associated therewith (i) a respective delay until a respective start of an exposure duration, (ii) the respective exposure duration over which image data is captured, and (iii) a respective total operation duration which include the respective delay and the respective exposure duration; (b) causing, by the host device and during the group acquisition operation, an illumination assembly to transition from a first state of operation to a second state of operation based on a shortest delay selected from each of the respective delay of the each of the plurality of imaging devices, the illumination assembly being operable to illuminate at least one target being imaged by each of the plurality of imaging devices; and (c) causing, during the group acquisition operation, the illumination assembly to transition from the second state of operation to a third state of operation based on a longest total operation duration selected from each of the respective total operation duration of the each of the plurality of imaging devices.

BRIEF DESCRIPTION OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
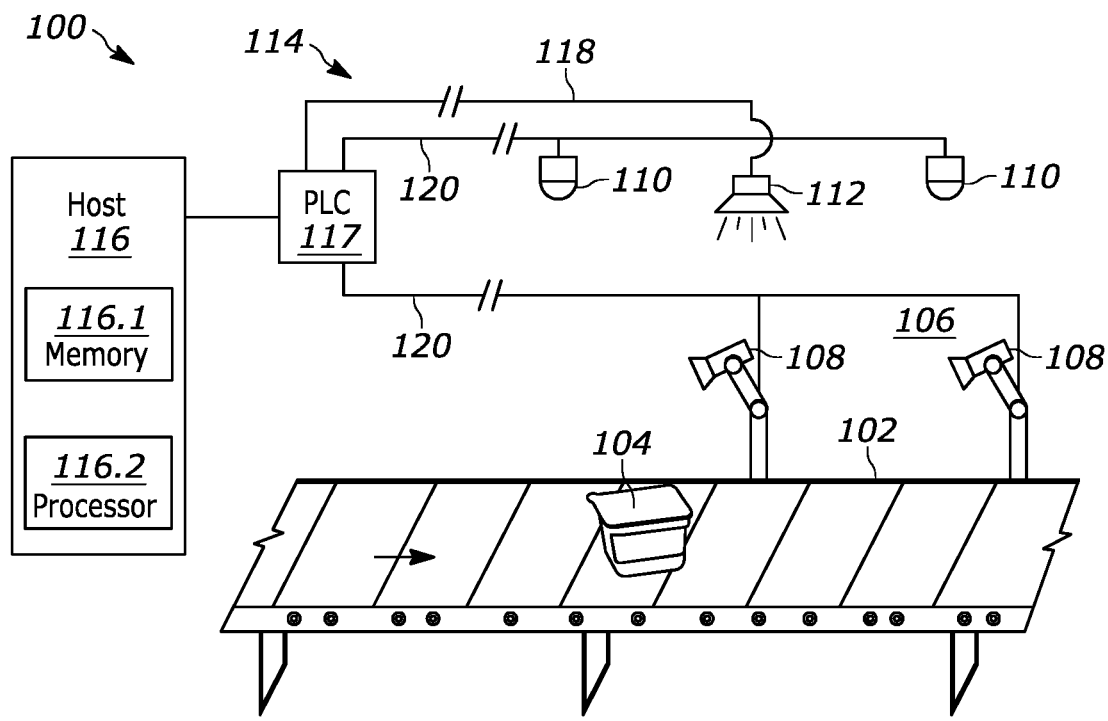
FIG. 1 illustrates an example environment having an example imaging and illumination system being used therein, in accordance with embodiments of the present disclosure.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

Referring now to FIG. 1, shown there in an example environment 100 where systems and methods in accordance with the present disclosure may be implemented and/or practiced. Environment 100 is illustrated having a conveyor 102 where item(s) 104 is placed thereon and is moved from left to right by way of said conveyor. As the item 104 moves through an imaging region 106, cameras (also referred to as imaging devices) 108, 110 obtain one or more images of the item 104 for downstream processing. To provide sufficient illumination of the item 104 during imaging operations, the environment 100 includes an illumination assembly 112 which emits light over at least some portion of each camera's field of view (FOV).

The collection of the plurality of cameras and the illumination assembly may be referred to, collectively, as an imaging system 114, which further includes a host device communicatively coupled to each of the cameras 108, 110 and the illumination assembly 112. The host 116 could take a form of a computer operable to execute an application that can provide illumination/imaging trigger signals downstream to the cameras 108, 110 and the illumination assembly 112 directly or indirectly (for example, thought a PLC 117). The application may be stored in a memory 116.1 of the host 116 and may be executed by a processor 116.2 of the host 116. It should be appreciated that certain aspect of the control of the various assemblies may also be handled by the PLC 117. To that extent, the PLC 117 may also include appropriate memory and processor elements so as to effectively conduct downstream control operations. In other examples, the PLC 117 may be integrated into the host 116.

The host is communicatively coupled to the illumination assembly 112 via communication means 118 and to imaging assemblies 108, 110 via communication means 120. Communication means 118, 120 between the host 116 and either of the illumination assembly 112 and/or the imaging assemblies 108, 110 can take any form that is within the scope of those of ordinary skill in the art. In prefer embodiments, host 116 is respectively connected, directly or indirectly, to (i) the illumination assembly 112 via a single communication bus and to (ii) the imaging assemblies 108, 110, all via wired connectivity using, for example, Ethernet, USB, serial, CoaXPress, FireWire, Camera Link, etc. While a direct connection can be employed, communication means 106, 108 can also include gateways, switches, routers, PLCs, and so on.

Retuning to the illumination assembly 112, it may be any assembly that is operable to emit electromagnetic radiation within the portion of the electromagnetic spectrum that is perceived by the human eye, or that falls within either the ultraviolet or infrared portion of the spectrum. Components responsible for this emission may include LEDs, lasers, halogen lamps, etc. Additionally, the illumination assembly may include a single light source (e.g., a single LED), multiple light sources (e.g., multiple LEDs), or multiple banks of light sources (e.g., multiple banks of LEDs, for example, or differing colors). Depending on the application, the illumination assembly can include one or more filter(s) like a polarizing or a color filter.

To operate the illumination assembly 112, the host 116 transmits an illumination signal (also referred to as an illumination control signal) via communication means 118 to the illumination assembly 112 which, by way of internal wiring and/or processing, causes the illumination assembly 112 to activate its light source(s) and provide illumination over an FOV for a predetermined duration. The actual activation of the illumination source can be achieved in a number of ways. For example, an illumination signal in a form of a pulse lasting t millisecond (ms) may be transmitted from the host directly to the illumination assembly 112 such that the current forming the pulse drives the illumination source for the t millisecond. In another example, the signal lasting t millisecond may be transmitted by the host where this signal activates a physical or a logical relay fort millisecond such that a drive current is passed through the relay to the illumination source for t millisecond. In yet another embodiment, the illumination assembly 112 may include an activation-duration register which can be programmed with a value that defined the illumination duration (e.g., t millisecond). In this instance, the host 116 can transmit a trigger signal to the illumination assembly 112 to activate its illumination source for the duration which is defied by the value programmed into the activation-duration register.

Turning now to the imaging assemblies 108, 110, in various example embodiment each assembly includes an image sensor(s) (also referred to as an imaging sensor or imager) that is a solid-state device, for example, a CCD or a CMOS imager, having a one-dimensional array of addressable image sensors or pixels arranged in a single row, or a two-dimensional array of addressable image sensors or pixels arranged in mutually orthogonal rows and columns, and operative for detecting return light captured by a lens group over an imaging FOV along an imaging axis that is normal to the substantially flat image sensor. The lens group is operative for focusing the return light onto the array of image sensors (also referred to as pixels) to enable the image sensor, and thereby the imaging assembly, to form a digital image. In particular, the light that impinges on the pixels is sensed and the output of those pixels produce image data that is associated with the environment that appears within the FOV (which can include the target 104). This image data may be processed by an internal controller/processor (e.g., by being sent to a decoder which identifies and decodes decodable indicia captured in the image data) and/or it may be sent upstream to the host 116 for processing thereby.

The activation of the imaging sensor of the imaging assemblies 108, 110 can be controlled, at least in part, from the host 116 via the communication means 120. In some instances, a pulse of duration y millisecond may be sent by the host directly to an imaging assembly 108/110 whereby the current that forms the pulse drives the imaging sensor to capture image data over a frame. In other instances, a pulse having a duration y millisecond and transmitted by the host 116 can be routed to a logical and/or physical relay whereby that relay permits a drive current to be sent to the image sensor for a duration of y millisecond. In still other embodiment, an imaging assembly 108/110 and/or its corresponding imaging sensor can include a register whereby the value written to said register is associated with the duration (e.g., a duration of y millisecond) over which the sensor will capture image data for a single frame in response to a trigger signal. In this instance, in response to receiving an exposure trigger signal (also referred to as an exposure signal or an exposure control signal), the image sensor is activated to capture image data for a duration of y millisecond over a frame.

Figure 2:
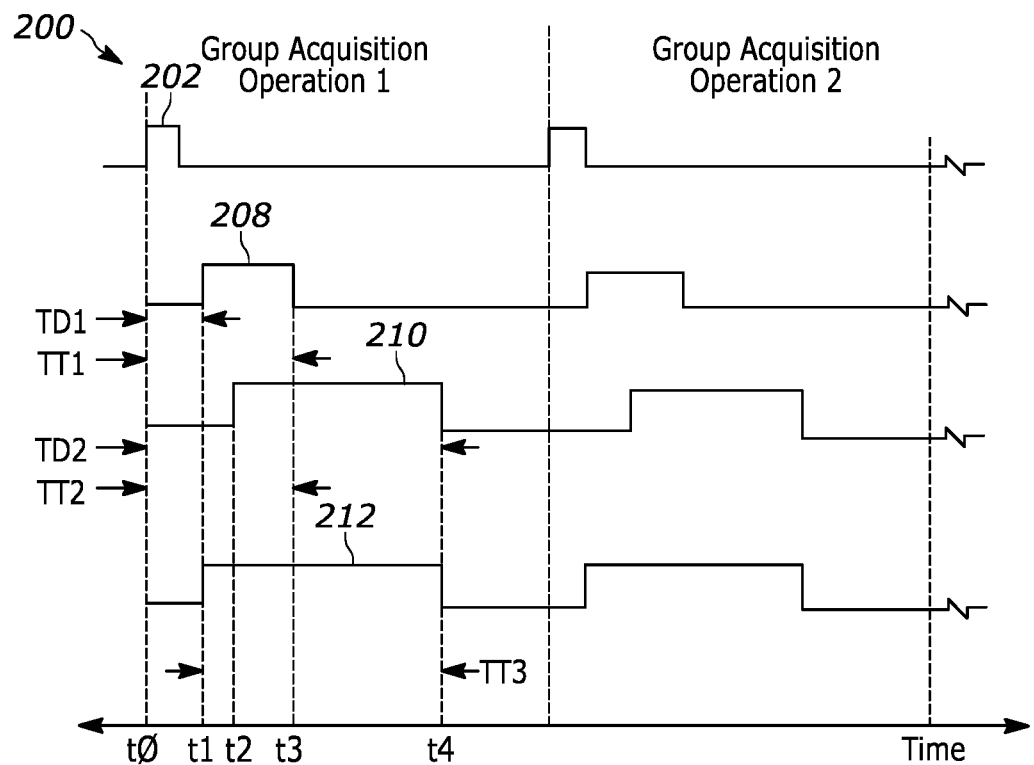
FIG. 2 is an example timing diagram of various signals transmitted from a host to imaging assemblies and illumination assembly, in accordance with embodiments of the present disclosure.
Figure 3:
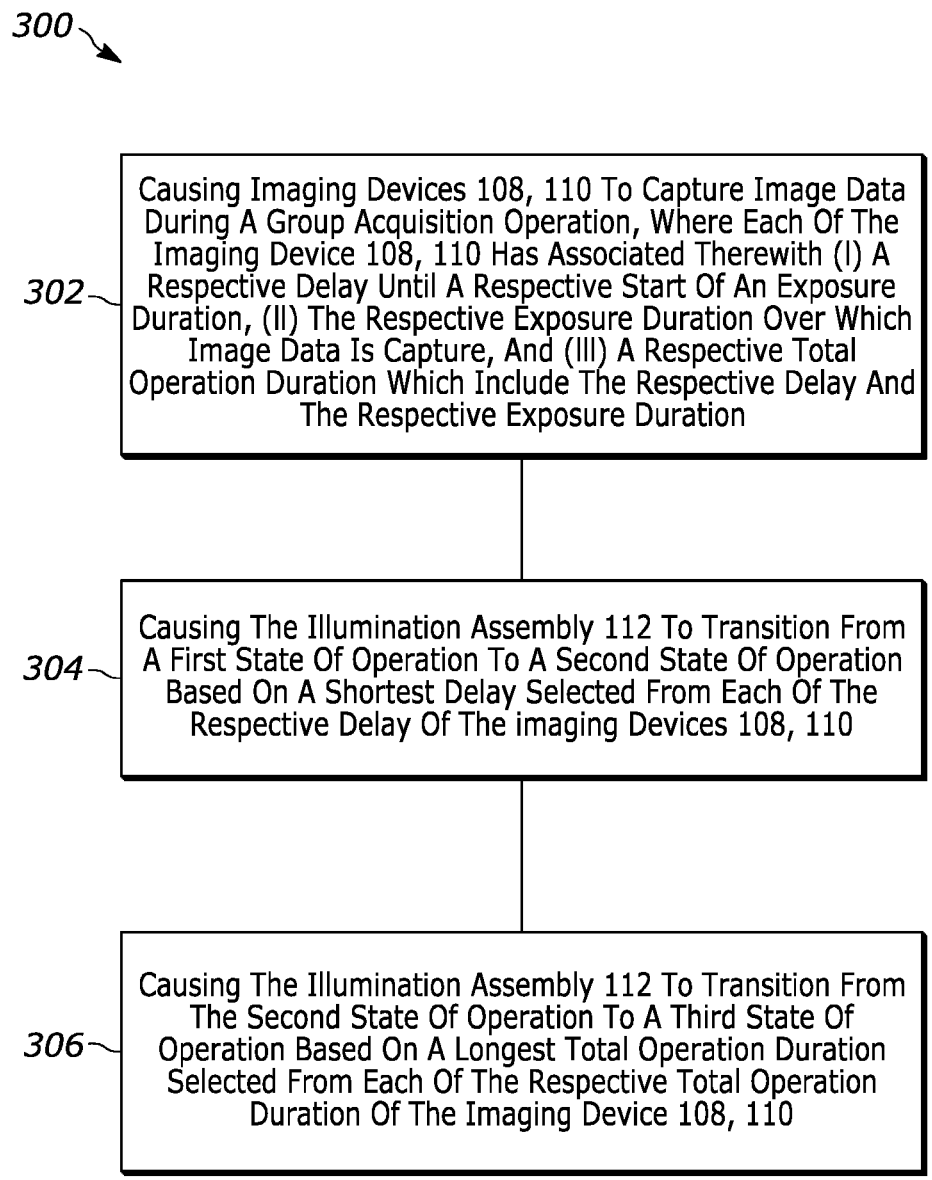
FIG. 3 is an example process flow corresponding to the timing diagram of FIG. 2, in accordance with embodiments of the present disclosure.

As noted earlier, in some examples imaging assemblies 108 and 110 may have different activation times and/or exposure durations. Referring to FIGS. 2 and 3, shown therein is an example timing diagram 200 of various signals transmitted from the host 116 (and in this example through a PLC 117) to the imaging assemblies 108, 110, and the illumination assembly 112, and a process flow 300 corresponding to the timing diagram, respectively, in accordance with the present disclosure. More specifically, at time t0 the host 116 transmits a trigger signal 202 to the PLC 117. In this example, the PLC 117 is programmed with various delays on when each imaging assembly 108, 110 should be activated and with what exposure duration. For the sake of simplicity, both imaging assemblies 108 of FIG. 1 will be seen as operating synchronously, and both imaging assemblies 110 of FIG. 1 will also be seen as operating synchronously. However, it should be appreciated that individual camera control is also within the scope of the methodologies and approaches presented herein.

Upon receipt of the trigger signal 202 by the PLC 117 (as, for example, generated by the host 116 based on a machine application executing an machine vision job), the PLC transmits exposure control signals 208 and 210 to imaging assemblies 108 and 110, respectively. As is apparent from the diagram 200, the exposure control signal 108 is transmitted to the imaging devices 108 with a time delay TD1 at time t1. The exposure duration over which image data is captured by the imaging devices 108 lasts t3-t1 resulting in the total operation duration being TT1 which is equivalent to t3-t0. Similarly, the exposure control signal 110 is transmitted to the imaging devices 110 with a time delay TD2 at time t2. The exposure duration over which image data is captured by the imaging devices 110 lasts t4-t2 resulting in the total operation duration being TT2 which is equivalent to t4-t0. Referring to FIG. 3, this collection of transmissions causes 302 imaging devices 108, 110 to capture image data during a group acquisition operation, where each of the imaging devices 108, 110 has associated therewith (i) a respective delay until a respective start of an exposure duration, (ii) the respective exposure duration over which image data is captured, and (iii) a respective total operation duration which include the respective delay and the respective exposure duration. It should be appreciated that, in some embodiments, a group acquisition operation is a collection of signals that are directed to a series of imaging devices grouped together in some manner (e.g., a group that includes a single illumination assembly that is coupled to a host via a single communication bus).

To help ensure proper illumination over the entire exposure duration, the PLC 117 transmits a shared illumination control signal 212 to the illumination assembly 112. This signal is transmitted at time t1 and lasts until time t4. Specifically, the start of the signal 212 corresponds to shortest time delay selected from each of the time delays TD1 and TD2 of the imaging devices 108, 110. In this example, the shortest time delay is TD1 corresponding to the exposure pulse 208 for imaging assembly 108 which is triggered by the PLC at time t1. The effect of the commencement of signal 212 is that the PLC causes 304 the illumination assembly 112 to transition from a first state of operation to a second state of operation and this occurs based on a shortest delay selected from each of the respective delay of the imaging devices 108, 110.

The signal 212 remains active until time t4 at which point the PLC causes 306 the illumination assembly 112 to transition from the second state of operation to a third state of operation. The timing of this transition is based on a longest total operation duration of each of the imaging devices 108, 110. In the example provided, this corresponds to the total operating duration TT2 and particularly its completion at time t4.

From this, the specific duration of the shared illumination pulse 212 may be calculated as the longest total operation duration (TT2)— the shortest time delay (TD1). Additionally, the commencement of the shared illumination pulse 212 may be associated with the commencement of the exposure control pulse with the shortest time delay (t1) and the completion of the shared illumination pulse 212 may be associated with the completion of the exposure control pulse of the imaging assembly having the longest total operation duration (t4).

It should be appreciated that these time delays and operating durations do not have to be calculated in real time and can instead be pre-programmed in the memory of a host/PLC during the configuration of, for example, a machine vision job based on the requirements and imaging parameters of that job. It should also be appreciated that while in some instances only a single group acquisition operation will be requested, for example for each execution of a machine vision job, the same methodology may apply to an indefinite number of group acquisition operations, as shown in FIG. 2 where Group Acquisition Operation 2 follows Group Acquisition Operation 1 in succession. Finally, while only two exposure signals 208 and 210 being transmitted to two distinct imaging assemblies 108 and 110 are illustrated, it should be apparent that the described approaches can be expanded to any number of imaging devices.

Employing the aforementioned approach allows for the illumination assembly to remain active for only a needed period of time rather than being always on. This is particularly advantageous in configuration where a group of imaging assemblies have only one illumination assembly associated therewith and where the illumination assembly is connected to its host via only a single communication bus. As such, the illumination assembly may transition between an off state (when the pulse 212 is low) and an active state (when the pulse 212 is high). Alternatively, the illumination assembly 212 may alternate between a lower illumination intensity state (when the pulse 212 is low) and a higher illumination intensity state (when the pulse 212 is high).

The above description refers to a block diagram of the accompanying drawings. Alternative implementations of the example represented by the block diagram includes one or more additional or alternative elements, processes and/or devices. Additionally or alternatively, one or more of the example blocks of the diagram may be combined, divided, re-arranged or omitted. Components represented by the blocks of the diagram are implemented by hardware, software, firmware, and/or any combination of hardware, software and/or firmware. In some examples, at least one of the components represented by the blocks is implemented by a logic circuit. As used herein, the term "logic circuit" is expressly defined as a physical device including at least one hardware component configured (e.g., via operation in accordance with a predetermined configuration and/or via execution of stored machine-readable instructions) to control one or more machines and/or perform operations of one or more machines. Examples of a logic circuit include one or more processors, one or more coprocessors, one or more microprocessors, one or more controllers, one or more digital signal processors (DSPs), one or more application specific integrated circuits (ASICs), one or more field programmable gate arrays (FPGAs), one or more microcontroller units (MCUs), one or more hardware accelerators, one or more special-purpose computer chips, and one or more system-on-a-chip (SoC) devices. Some example logic circuits, such as ASICs or FPGAs, are specifically configured hardware for performing operations (e.g., one or more of the operations described herein and represented by the flowcharts of this disclosure, if such are present). Some example logic circuits are hardware that executes machine-readable instructions to perform operations (e.g., one or more of the operations described herein and represented by the flowcharts of this disclosure, if such are present). Some example logic circuits include a combination of specifically configured hardware and hardware that executes machine-readable instructions. The above description refers to various operations described herein and flowcharts that may be appended hereto to illustrate the flow of those operations. Any such flowcharts are representative of example methods disclosed herein. In some examples, the methods represented by the flowcharts implement the apparatus represented by the block diagrams. Alternative implementations of example methods disclosed herein may include additional or alternative operations. Further, operations of alternative implementations of the methods disclosed herein may combined, divided, re-arranged or omitted. In some examples, the operations described herein are implemented by machine-readable instructions (e.g., software and/or firmware) stored on a medium (e.g., a tangible machine-readable medium) for execution by one or more logic circuits (e.g., processor(s)). In some examples, the operations described herein are implemented by one or more configurations of one or more specifically designed logic circuits (e.g., ASIC(s)). In some examples the operations described herein are implemented by a combination of specifically designed logic circuit(s) and machine-readable instructions stored on a medium (e.g., a tangible machine-readable medium) for execution by logic circuit(s).

As used herein, each of the terms "tangible machine-readable medium," "non-transitory machine-readable medium" and "machine-readable storage device" is expressly defined as a storage medium (e.g., a platter of a hard disk drive, a digital versatile disc, a compact disc, flash memory, read-only memory, random-access memory, etc.) on which machine-readable instructions (e.g., program code in the form of, for example, software and/or firmware) are stored for any suitable duration of time (e.g., permanently, for an extended period of time (e.g., while a program associated with the machine-readable instructions is executing), and/or a short period of time (e.g., while the machine-readable instructions are cached and/or during a buffering process)). Further, as used herein, each of the terms "tangible machine-readable medium," "non-transitory machine-readable medium" and "machine-readable storage device" is expressly defined to exclude propagating signals. That is, as used in any claim of this patent, none of the terms "tangible machine-readable medium," "non-transitory machine-readable medium," and "machine-readable storage device" can be read to be implemented by a propagating signal.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings. Additionally, the described embodiments/examples/implementations should not be interpreted as mutually exclusive, and should instead be understood as potentially combinable if such combinations are permissive in any way. In other words, any feature disclosed in any of the aforementioned embodiments/examples/implementations may be included in any of the other aforementioned embodiments/examples/implementations.

The benefits, advantages, solutions to problems, and any element(s) that may cause any benefit, advantage, or solution to occur or become more pronounced are not to be construed as a critical, required, or essential features or elements of any or all the claims. The claimed invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter may lie in less than all features of a single disclosed embodiment. Thus, the following claims are hereby incorporated into the Detailed Description, with each claim standing on its own as a separately claimed subject matter.

The invention claimed is:

1. An imaging system comprising:
a host device having a processor;
a plurality of imaging devices, each of the plurality of imaging devices being communicatively coupled with the host device; and
an illumination assembly for illuminating at least one target being imaged by each of the plurality of imaging devices, the illumination assembly being communicatively coupled with the host device,
wherein each of the plurality of imaging devices is caused, by the host, to capture image data during a group acquisition operation, each of the plurality of imaging devices having associated therewith (i) a respective delay until a respective start of an exposure duration, (ii) the respective exposure duration over which image data is captured, and (iii) a respective total operation duration which include the respective delay and the respective exposure duration,
wherein, during the group acquisition operation, the illumination assembly is caused, by the host device, to transition from a first state of operation to a second state of operation based on a shortest delay selected from each of the respective delay of the each of the plurality of imaging devices, and
wherein, during the group acquisition operation, the illumination assembly is caused to transition from the second state of operation to a third state of operation based on a longest total operation duration selected from each of the respective total operation duration of the each of the plurality of imaging devices.

2. The system of claim 1, wherein the group acquisition operation is triggered by the host device.

3. The system of claim 1, wherein each of the plurality of imaging devices captures image data during the group acquisition operation over a respective single exposure operation.

4. The system of claim 1, wherein, for each of the plurality of imaging devices, the respective delay until the respective start of the exposure duration is measured from a job-trigger initiated by the host device.

5. The system of claim 1, wherein the plurality of imaging devices have no other illumination assemblies associated therewith.

6. The system of claim 1, wherein the first state of operation of the illumination assembly is the same as the third state of operation of the illumination assembly.

7. The system of claim 1, wherein in second state of operation the illumination assembly emits more light than in the first state of operation.

8. The system of claim 7, wherein in first state of operation the illumination assembly is deactivated to not emit light, and wherein in the second state of operation the illumination assembly is activated to emit light.

9. The system of claim 1, wherein the host device is further configured to store, in a memory, for each of the plurality of imaging devices, the (i) the respective delay until the respective start of the exposure duration, the (ii) the respective exposure duration over which the image data is captured.

10. The system of claim 1, wherein the illumination assembly is coupled with the host device via a single communication bus.

11. The system of claim 1, wherein, responsive to executing a machine vision job, the host device causes the plurality of imaging devices to perform a plurality of group acquisition operations in succession.

12. A method of operating a vision system, comprising:
(a) causing, by a host device having a processor, each of a plurality of imaging devices to capture image data during a group acquisition operation, each of the plurality of imaging devices having associated therewith (i) a respective delay until a respective start of an exposure duration, (ii) the respective exposure duration over which image data is captured, and (iii) a respective total operation duration which include the respective delay and the respective exposure duration;
(b) causing, by the host device and during the group acquisition operation, an illumination assembly to transition from a first state of operation to a second state of operation based on a shortest delay selected from each of the respective delay of the each of the plurality of imaging devices, the illumination assembly being operable to illuminate at least one target being imaged by each of the plurality of imaging devices; and
(c) causing, during the group acquisition operation, the illumination assembly to transition from the second state of operation to a third state of operation based on a longest total operation duration selected from each of the respective total operation duration of the each of the plurality of imaging devices.

13. The method of claim 12, wherein the group acquisition operation is triggered by the host device.

14. The method of claim 12, wherein each of the plurality of imaging devices captures image data during the group acquisition operation over a respective single exposure operation.

15. The method of claim 12, wherein, for each of the plurality of imaging devices, the respective delay until the respective start of the exposure duration is measured from a job-trigger initiated by the host device.

16. The method of claim 12, wherein no other illumination assemblies are operable to illuminate the at least one target being imaged by each of the plurality of imaging devices.

17. The method of claim 12, wherein the first state of operation of the illumination assembly is the same as the third state of operation of the illumination assembly.

18. The method of claim 12, wherein in second state of operation the illumination assembly emits more light than in the first state of operation.

19. The method of claim 18, wherein in first state of operation the illumination assembly is deactivated to not emit light, and wherein in the second state of operation the illumination assembly is activated to emit light.

20. The method of claim 12, wherein the illumination assembly is coupled with the host device via a single communication bus.

21. The method of claim 12, further comprising executing, via the host device, a machine vision job, wherein the machine vision job includes performing steps (a), (b), and (c) repetitively at least two times.

* * * * *